United States Patent
Lin et al.

(10) Patent No.: US 7,729,143 B2
(45) Date of Patent: Jun. 1, 2010

(54) POWER SUPPLY HAVING AN EXTENDING HOLD-UP TIME CONTROLLING UNIT

(75) Inventors: Wei-Liang Lin, Taipei Hsien (TW); Shun-Te Chang, Taipei Hsien (TW)

(73) Assignee: Acbel Polytech Inc., Taipei Hsien (TW)

( * ) Notice: Subject to any disclaimer, the term of this patent is extended or adjusted under 35 U.S.C. 154(b) by 236 days.

(21) Appl. No.: 12/081,251

(22) Filed: Apr. 14, 2008

(65) Prior Publication Data

US 2009/0097286 A1     Apr. 16, 2009

(30) Foreign Application Priority Data

Oct. 15, 2007   (TW) .............................. 96138392 A

(51) Int. Cl.
*H02J 1/00* (2006.01)
(52) U.S. Cl. ........................................................ 363/65
(58) Field of Classification Search .................. 363/65, 363/89
See application file for complete search history.

(56) References Cited

U.S. PATENT DOCUMENTS 5,561,596 A  * 10/1996 Hemena et al. ............... 363/50
6,504,497 B2 * 1/2003 Jang et al. ...................... 363/89
6,788,040 B2 * 9/2004 Lubomirsky ................. 323/303
6,879,140 B2 * 4/2005 Elkin et al. .................. 323/303
7,061,212 B2 * 6/2006 Phadke ......................... 323/222
7,408,795 B2 * 8/2008 Vinciarelli ................... 363/125
2004/0156217 A1 * 8/2004 Phadke ..................... 363/21.16

* cited by examiner

*Primary Examiner*—Bao Q Vu
*Assistant Examiner*—Jue Zhang
(74) *Attorney, Agent, or Firm*—Bacon & Thomas, PLLC

(57) ABSTRACT

A hold-up time extension controlling device for a power supply, that has a power factor correction circuit, a hold-up time extension circuit, a hold-up time controlling circuit, a storage capacitor and a DC to DC converter. The hold-up time extension controlling device has a switch and an auxiliary capacitor. When an AC power source is normal, the switch is controlled to turn on according to the power factor correction circuit to make the auxiliary capacitor connecting to the storage capacitor in parallel to averagely have a ripple current. When the AC power source is interrupted, the switch is controlled to turn off. At the time, the hold-up time extension circuit obtains a storage power of the auxiliary capacitor and then output to the DC to DC converter to keep the voltage of the storage capacitor at a preset voltage for a long time.

9 Claims, 7 Drawing Sheets

POWER SUPPLY HAVING AN EXTENDING HOLD-UP TIME CONTROLLING UNIT

BACKGROUND OF THE INVENTION

1. Field of the Invention

The present invention relates to a power supply, and more particularly to a power supply having an extending hold-up time controlling unit.

2. Description of Related Art

Power systems are necessary elements for industrial equipments, and more specifically to an AC to DC power supply, which is one type of the power system. One important characteristic of the AC to DC power supply is hold-up time. When the line power is interrupted, the AC to DC power supply has to supply DC power for a while to let the load have enough time to storage data and orderly terminate the operation.

A general AC to DC power supply mainly has a rectifier, a power factor correction circuit, an output capacitor and a DC to DC converter. The output capacitor is coupled between outputs of the power factor correction circuit and inputs of the DC to DC converter. In the normal condition, the output capacitor has a function of suppressing ripple current. Once the AC power source supplied to the rectifier is interrupted, the output capacitor discharges a storage current therein to the DC to DC converter. The DC to DC converter outputs the DC power to the load for a while after the AC power source is interrupted, so the load shuts down safely.

Based on the foregoing description, a function of extending hold-up time is required by each power supply. Since a capacitance of the output capacitor determines the hold-up time, the output capacitor usually uses a bulk capacitor. However, the bulk capacitor has a large size to occupy a larger space in the power supply. Therefore, the bulk capacitor limits the miniaturization scale of the power supply.

To solve the foregoing drawback of the general AC to DC power supply, a hold-up time extension circuit is disclosed in the U.S. Pat. No. 6,504,497 (hereinafter '497 patent). With reference to FIG. 4, the hold-up time extension circuit (90) is electronically connected to a power supply having a rectifier (70), a diode ($D_{BO}$), a DC to DC converter (80), an output capacitor ($C_{BO}$) and an auxiliary capacitor ($C_{BAUX}$). The rectifier (70) is coupled to the DC to DC converter (80) through the diode ($D_{BO}$). The output capacitor ($C_{BO}$) is electronically between the cathode electrode of the diode ($D_{BO}$) and a ground. The auxiliary capacitor ($C_{BAUX}$) is electronically between the anode electrode of the diode ($D_{BO}$) and the ground. The end of the auxiliary capacitor ($C_{BAUX}$) connected to the anode electrode of the diode ($D_{BO}$) is also electronically connected to the hold-up time extension circuit (90). The output of the hold-up time extension circuit (90) is electronically connected to the input of the DC to DC converter (80).

When a voltage ($V_{BO}$) stored in the output capacitor ($C_{BO}$) is lower than a preset voltage, the auxiliary capacitor ($C_{BAUX}$) discharges a storage current therein to the hold-up time extension circuit (90). The hold-up time extension circuit (90) converts the storage current of the auxiliary capacitor ($C_{BAUX}$) and then outputs to the DC to DC converter (80). Therefore, the voltage of the output capacitor ($C_{BO}$) is not decreased to zero in a short time and is extended.

Even thought the hold-up time extension circuit (90) of the '497 patent still has obvious drawbacks as follows.

1. In the normal condition, the output capacitor and the auxiliary capacitor are electronically connected in parallel. However, a diode is electronically connected between the output and auxiliary capacitors, so a positive voltage (about 0.7V) dropped at the diode exists between the output and auxiliary capacitors. The 0.7V voltage results that an output current with a large ripple current from the rectifier is output to the output capacitor. Therefore, the operation life of the capacitor is decreased. That is, under a normal condition of the AC power source, the auxiliary capacitor and output capacitor can not share averagely, so the output capacitor has a shorter operation life and easily becomes useless. Accordingly, an operation life of the AC to DC power supply is also decreased.

2. The AC to DC power supply including the hold-up time extension circuit of the '497 patent still uses a bulk capacitor to be the output capacitor to increase its operation life under receiving the larger ripple current condition. Therefore, the AC to DC power supply including the hold-up time extension circuit of the '497 patent does not reduce the entire size wildly.

With reference to FIG. 5, a circuit for maintaining hold-up time while reducing a size of the bulk capacitor size and improving efficiency in a power supply is disclosed in the U.S. Pat. No. 7,061,212 (hereinafter '212 patent). The power supply with a maintaining hold-up time circuit has a bridge rectifier, a first stage boost converter (110), a second stage boost converter (120), and a DC to DC converter (130). The first and second stage boost converters (110, 120) are electronically in serial between the bridge rectifier and the DC to DC converter (130). Therefore, the capacitors (118, 128) of the first and second stage boost converters (110, 120) commonly receive the ripple current from the bridge rectifier and are used to supply power to the DC to DC converter (130) when the AC power source is interrupted.

The power supply of the '212 patent uses two stage boost converters (110, 120) to solve the drawbacks of the power supply with the hold-up time circuit of the '497 patent. However, the inductor (112, 122) and diode (116, 126) of the two stage boost converters (110, 120) cause power consumption in partial to decrease the power efficiency of the AC to DC power supply.

SUMMARY OF THE INVENTION

The main objective of the present invention is to provide a power supply having an extending hold-time controlling unit that not only efficiently extends hold-up time but also reduces an entire size of the power supply and further increases power efficiency of the power supply.

The power supply in accordance with the present invention has a power factor correction circuit, a hold-up time extension circuit, a hold-up time controlling circuit, a storage capacitor and a DC to DC converter. The hold-up time extension controlling device has a switch and an auxiliary capacitor. When an AC power source is normal, the switch is controlled to turn on according to the power factor correction circuit to make the auxiliary capacitor connecting to the storage capacitor in parallel to averagely have a ripple current. When the AC power source is interrupted, the switch is controlled to turn off. At the time, the hold-up time extension circuit obtains a storage power of the auxiliary capacitor and then output to the DC to DC converter to keep the voltage of the storage capacitor at a preset voltage for a long time.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
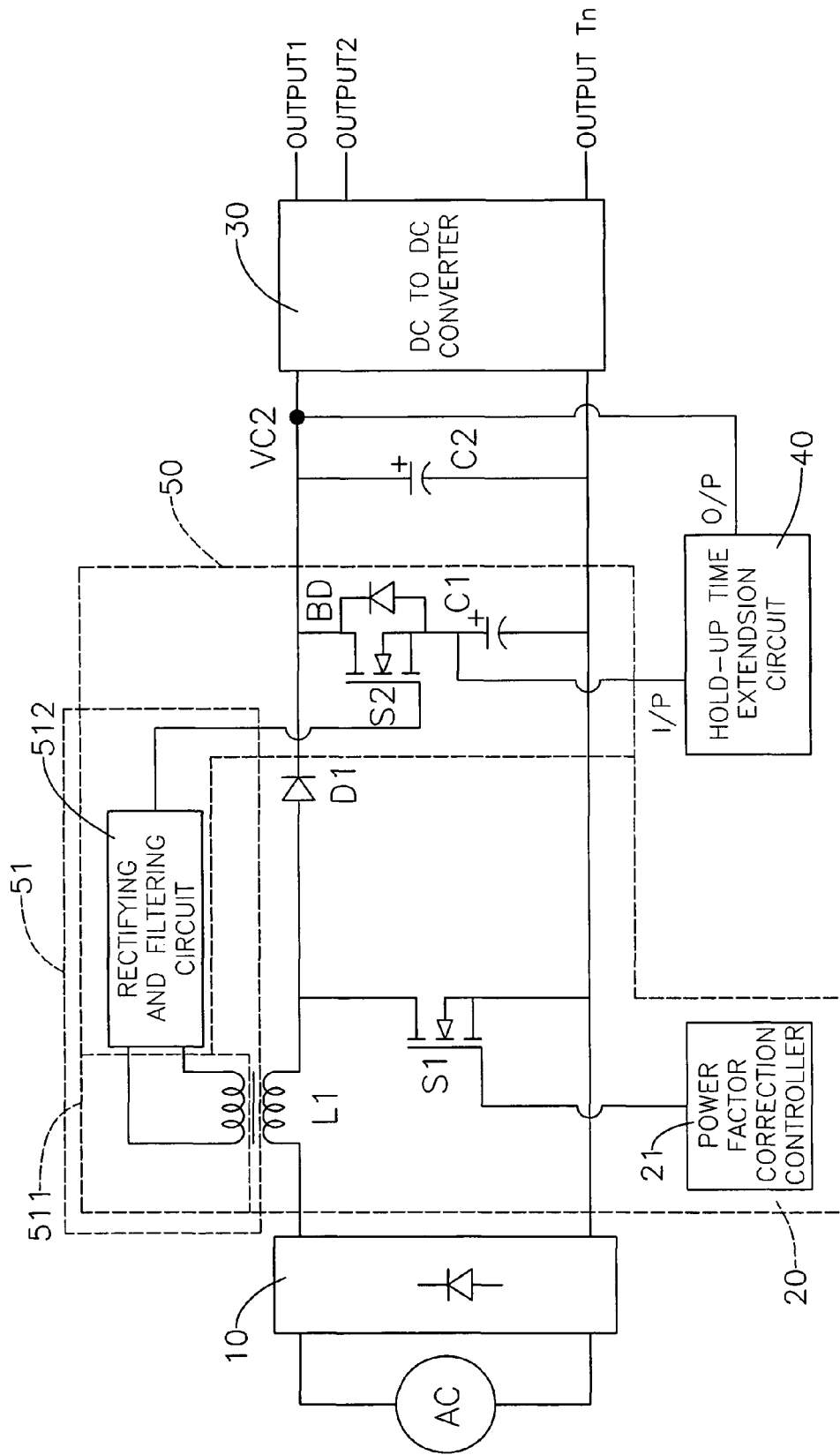
FIG. 1 is a functional diagram of a preferred embodiment of a hold-up time extension controlling device in accordance with the present invention.

With reference to FIG. 1, an AC to DC power supply has a rectifier (10), a power factor correction circuit (20), a DC to DC Converter (30), an output capacitor (C2) and a hold-up time extension circuit (40) and a hold-up time controlling circuit (50). The DC to DC converter (30) has an input and multiple outputs.

Figure 2A:
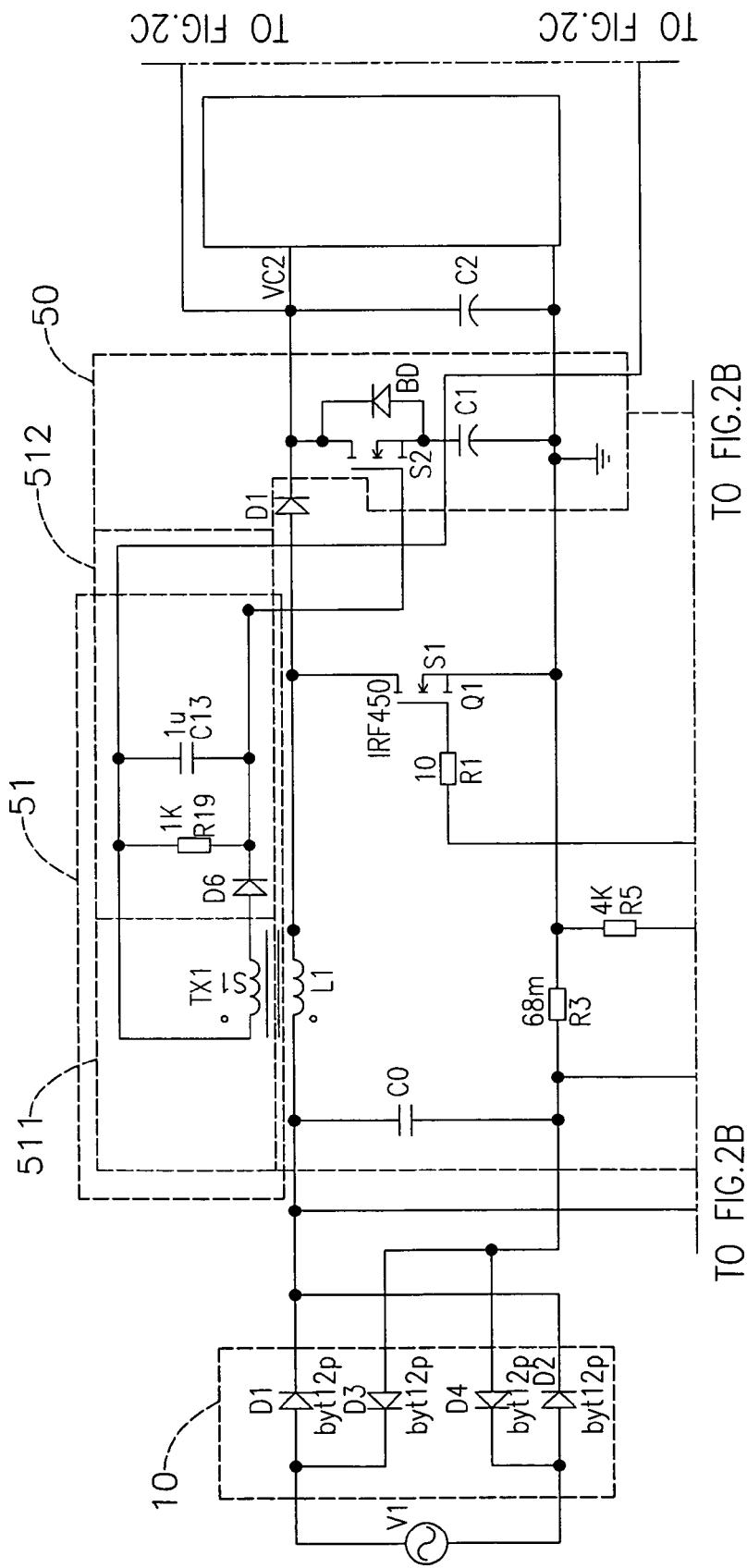
FIG. 2 is a detailed circuit of FIG. 1.
Figure 2B:
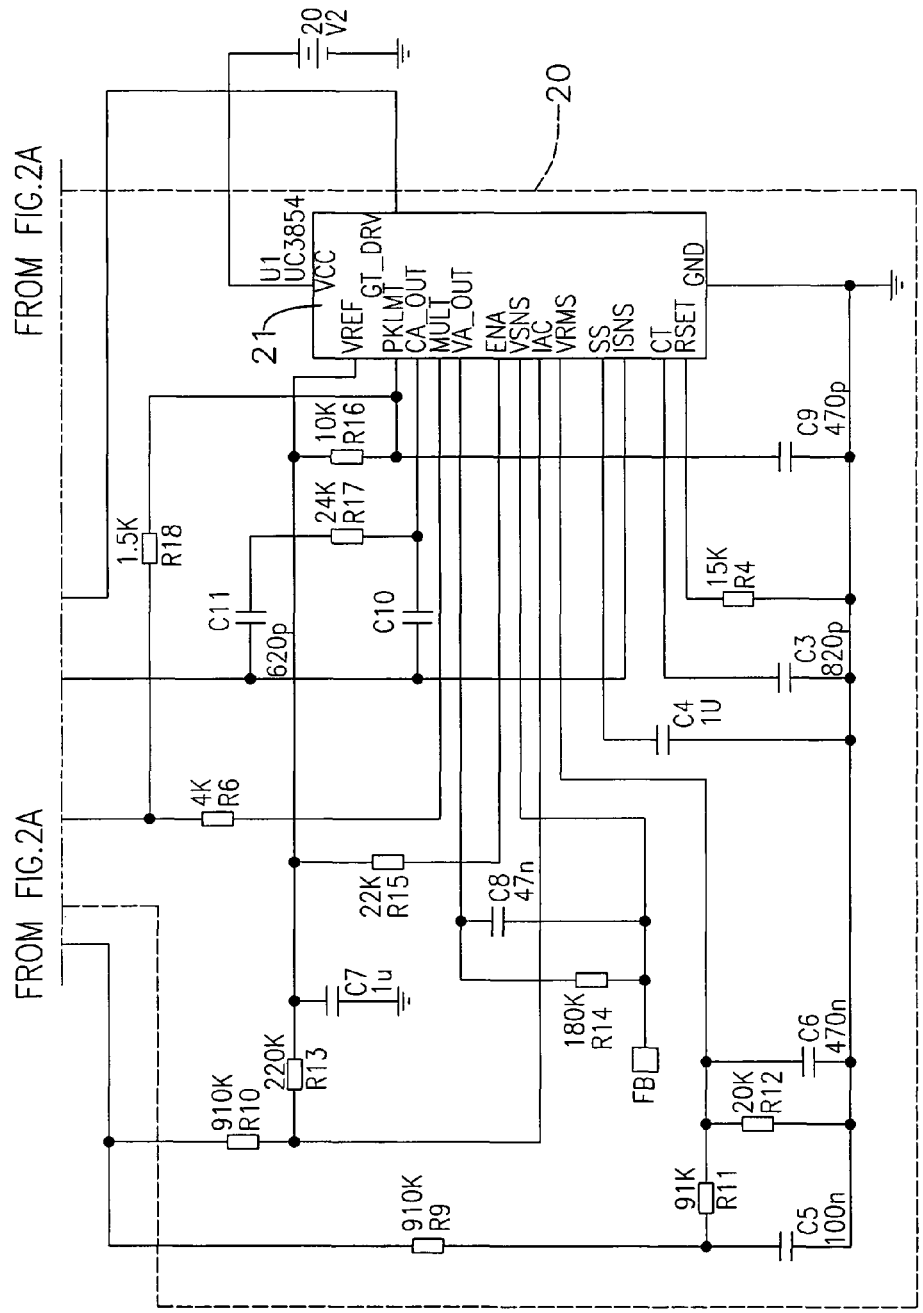
Figure 2C:
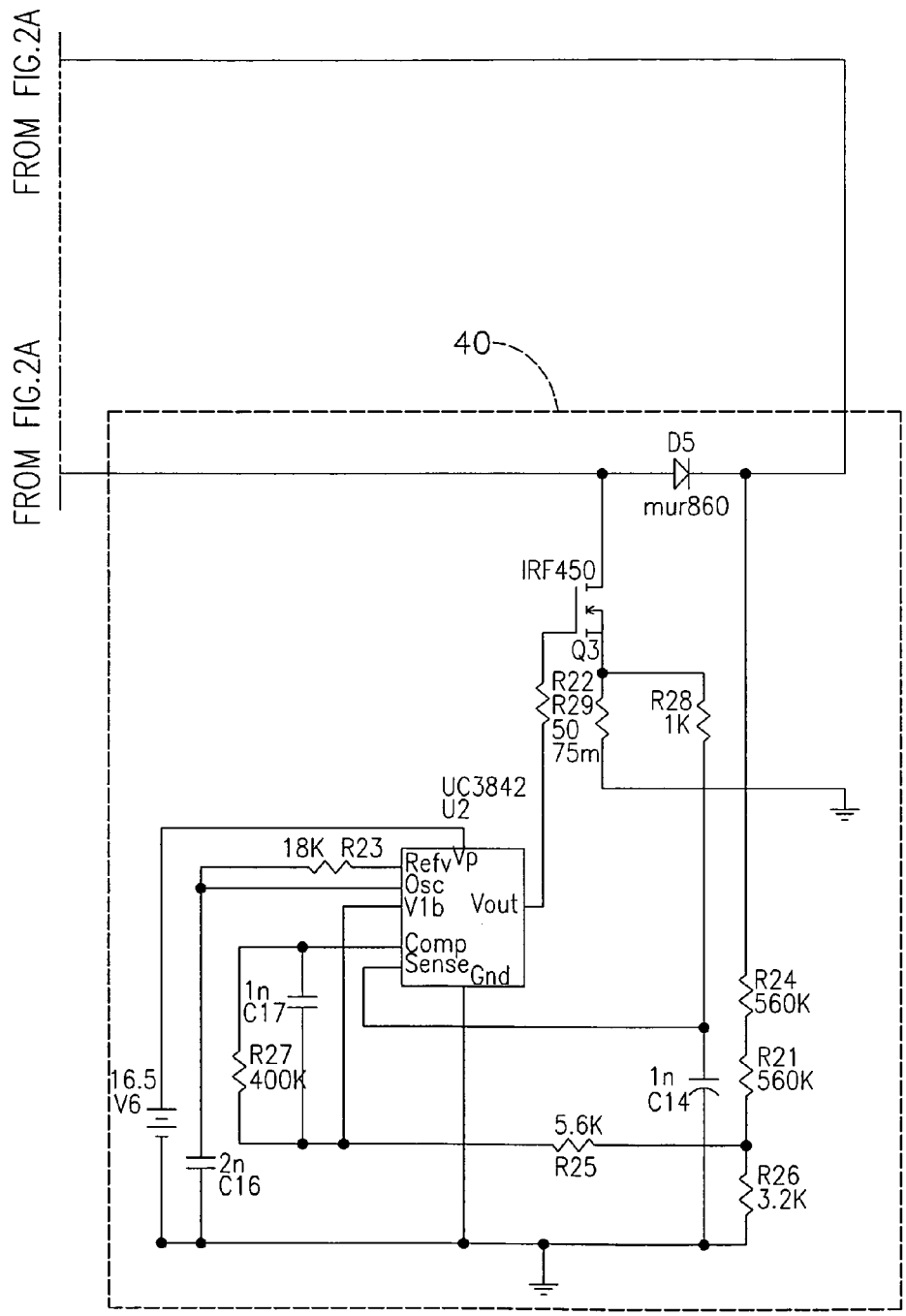

With further reference to FIG. 2, in the preferred embodiment, the rectifier (10) is a bridge rectifier and has an input and an output. The input is electronically connected to an external AC power source and the output is electronically connected to the power factor correction circuit (20).

The power factor correction circuit (20) has an inductor (L1), a first electronic switch (S1), a diode (D1) and a power factor controller (21). The first electronic switch (S1) has a controlling terminal connected to the power factor controller (21), so the power factor controller (21) controls the switch (S1) to turn on or turn off. One end of the inductor (L1) is electronically connected to the output of the rectifier (10) and the other end of the inductor (L1) is electronically connected to the input of the DC to DC converter (30) through the diode (D1).

The hold-up time extension circuit (40) has an input terminal and an output terminal. The input terminal is electronically connected to the hold-up time controlling circuit (50) and the output terminal is electronically connected to the input of the DC to DC converter (30).

In the preferred embodiment, the hold-up time controlling circuit (50) has an second electronic switch (S2), an auxiliary capacitor (C1) and an induced unit (51). The auxiliary capacitor (C1) has a first terminal and a second terminal. The first terminal is electronically connected to the output of the power factor correction circuit (20) through the second electric switch (S2) and input terminal (I/P) of the hold-up time extension circuit (40). The second terminal is electronically to ground. In this preferred embodiment, the second electric switch (S2) may be a FET transistor having a gate, a drain and a source. The gate, drain and source are respectively and electronically connected to the output of the induced unit (51), the output of the power factor correction circuit (20) and the first terminal of the auxiliary capacitor (C1).

The induced unit (51) induces a current in the inductor (L1) to output an induced voltage corresponding to the current in the inductor (L1). In this preferred embodiment, the induced unit (51) has an induced element (511) and a rectifying and filtering circuit (512). The induced element (511) may be a coil (TX1). The rectifying and filtering circuit (512) has a diode (D6) and a RC filter. The RC filter has a resistor (R19) and a capacitor (C13) electronically connected to the resistor (R19). The diode (D6) is electronically connected between the induced element and the RC filter. Since the second electric switch (S2) is a FET transistor, a body diode (BD) exists between the drain and source. In other preferred embodiment, a diode (BD) may be electronically connected to the drain and the source.

When the coil (TX1) obtains the induced voltage, the induced voltage is further rectified and filtered by the diode (D6) and the RC filter (R19, C13) and then the induced unit (51) outputs a DC voltage to control the second electric switch (S2) to turn on or turn off.

The input of the DC to DC converter (30) is electronically connected to the output of the power factor correction circuit (20) and the output terminal (O/P) of the hold-up time extension circuit (40). The output capacitor (C2) is electronically connected between the input of the DC to DC converter (30) and the ground.

When the AC power source is normally provided to the bridge rectifier (10), a DC power is output from the bridge rectifier (10). A time-variable voltage is dropped at the inductor (L1) of the power factor correction circuit (20) and the induced element (511) induces the same voltage. Therefore, the induced unit (51) outputs the DC voltage to the gate of the second electric switch (S2), so the second electric switch (S2) turns on. Since the second electric switch (S2) turns on, the auxiliary capacitor (C1) and the output capacitor (C2) are electronically connected in parallel. A junction voltage ($V_{DS}$) dropped at the second electronic switch (S2) in the ON status is smaller than a forward biased voltage (about 0.7V) dropped at the diode in the ON status. Therefore, the auxiliary capacitor (C1) and the output capacitor (C2) averagely take a ripple current from the front end circuit.

When the AC power source is interrupted, the bridge rectifier (10) does not output DC power, so the induced unit (51) does not output DC voltage to the second electronic switch (S2), too. At the time, the second electronic switch (S2) turns off. However, the auxiliary capacitor (C1) is still electronically connected to the output capacitor (C2) through the body diode (BD) or outside diode connected between the drain and the source of the second electronic switch (S2). Therefore, the DC to DC converter (30) obtains storage current from the auxiliary capacitor (C1) to extend the hold-up time and to prevent the voltage of the output capacitor (C2) from decreasing quickly. That is, when the voltage of the output capacitor (C2) is decreasing to a preset voltage after the AC power source is interrupted, the hold-up time extension circuit (40) is triggered to obtain the storage current in the auxiliary capacitor (C1), and then converts the storage current to a DC power. Therefore, the hold-up time extension circuit (40) continues to provide DC power to the DC to DC converter (30) to keep the voltage of the output capacitor (C2) being close to or equal to the preset voltage.

Figure 3:
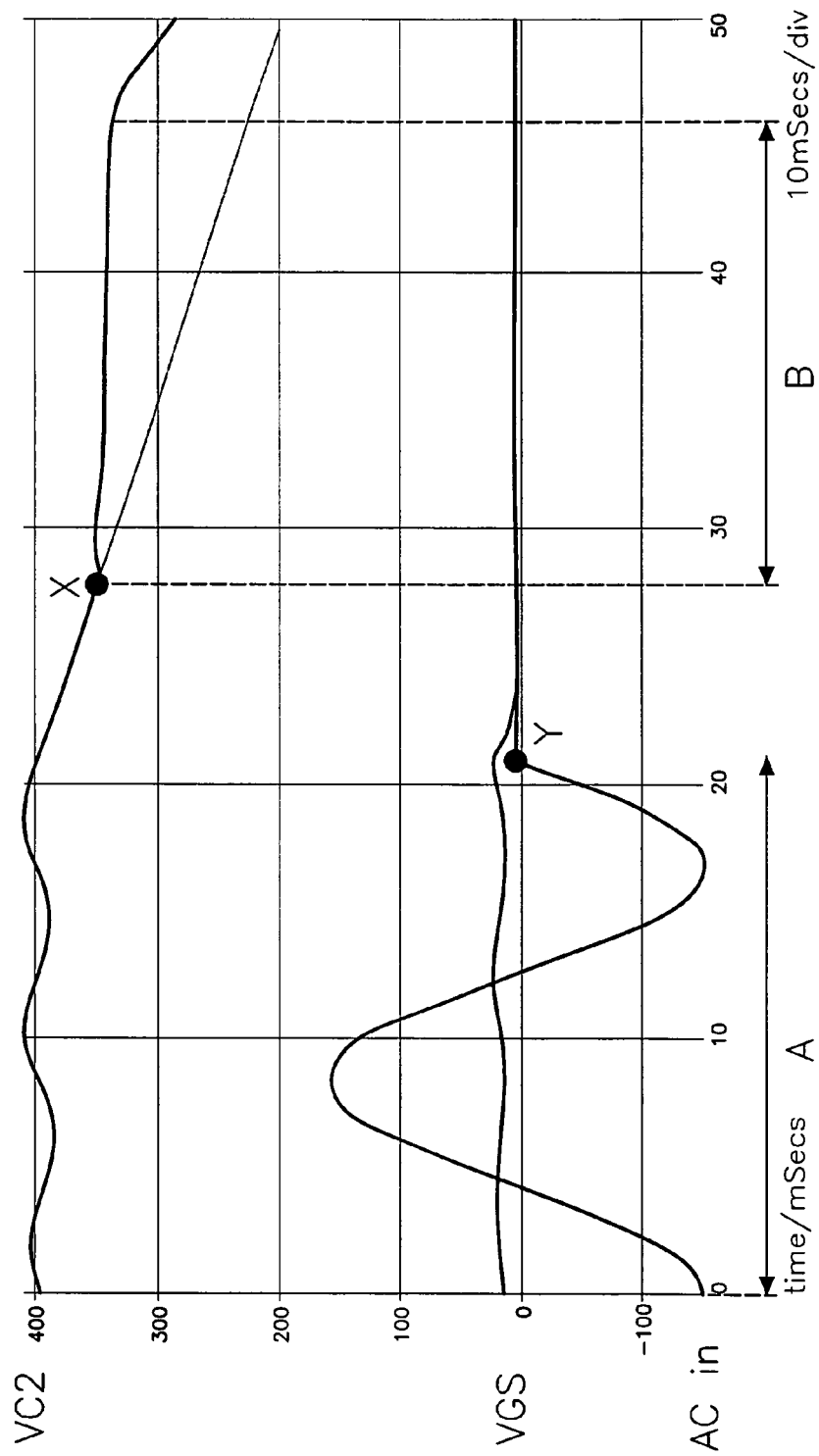
FIG. 3 is a characteristic curve diagram of the hold-up time extension controlling device in accordance with the present invention.
Figure 4:
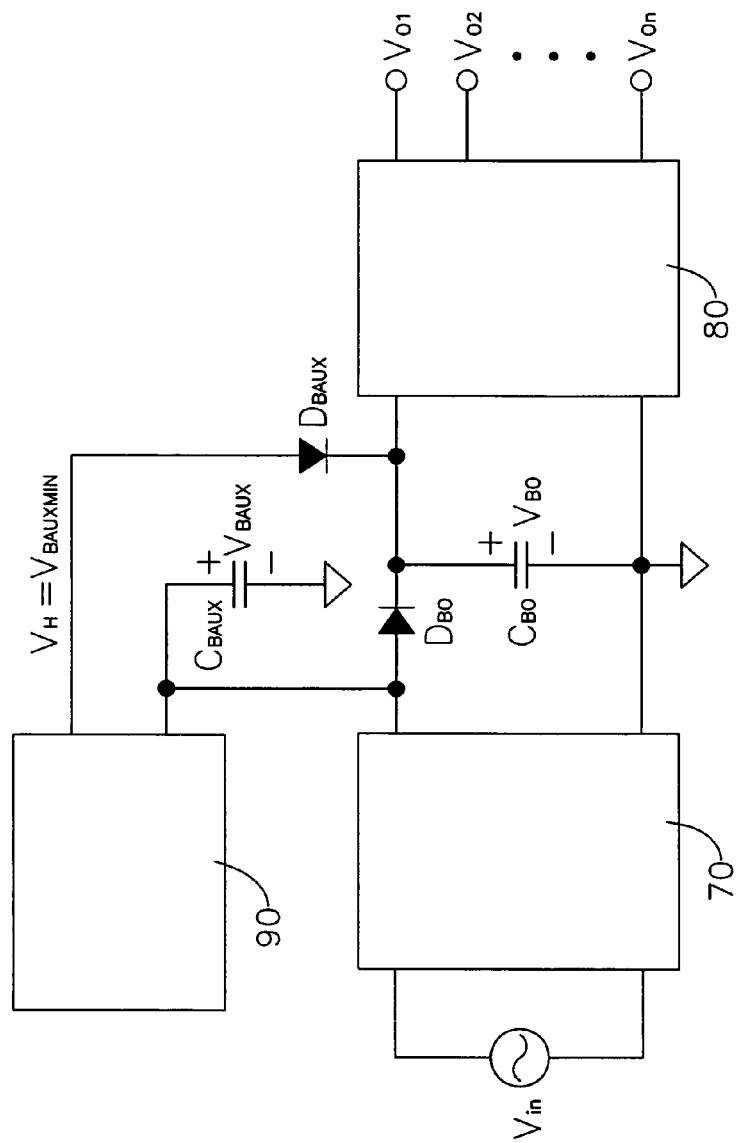
FIG. 4 is a functional diagram of a hold-up time extension circuit disclosed in the U.S. Pat. No. 6,504,497.
Figure 5:
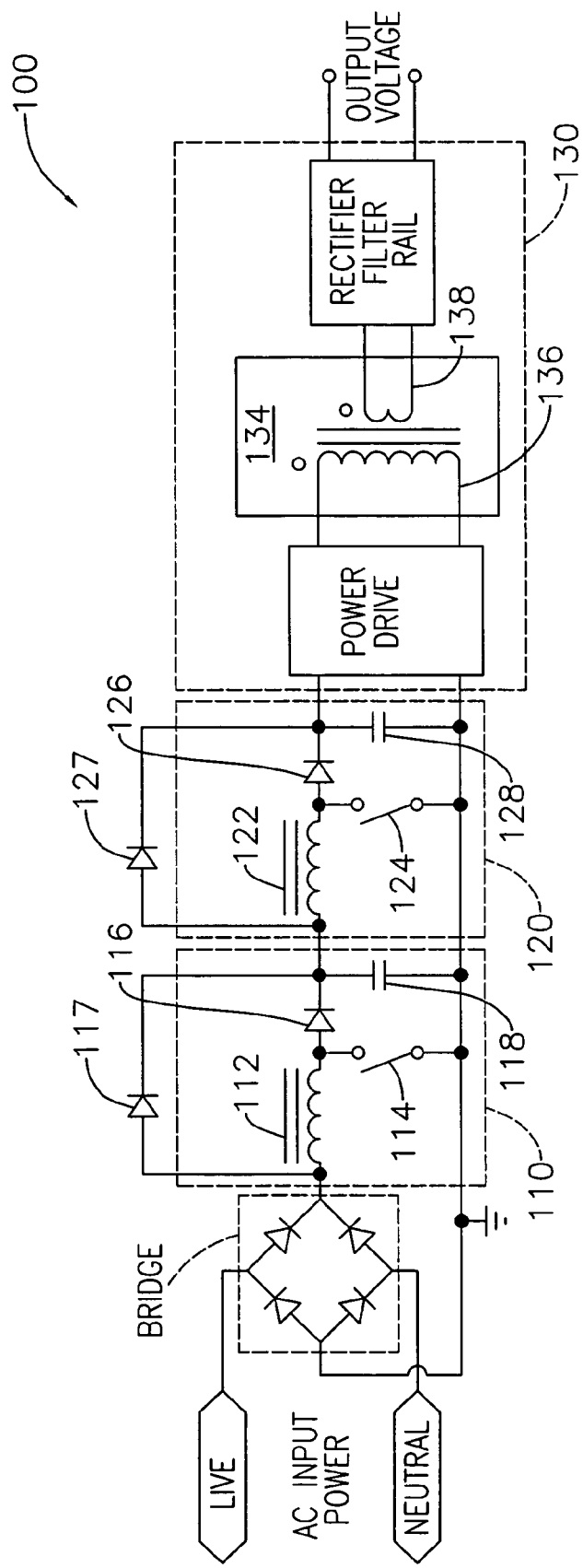
FIG. 5 is a functional diagram of a hold-up time extension circuit disclosed in the U.S. Pat. No. 7,061,212.

With further reference to FIG. 3, a reference "VC2" is designated to the voltage of the output capacitor (C2), a reference "VGS" is designated to the bias voltage of the second electronic switch (S2) and a reference "AC in" is designated to the AC power source waveform.

During the A time section, the bias voltage (VGS) of the second electric switch (S2) is large enough to make the second electronic switch turn on, since the AC power source is normal. The auxiliary and output capacitors (C1, C2) are electronically connected in parallel to averagely share the ripple current.

When the AC power source is provided at time point Y, the voltage of the output capacitor (C2) is decreasing. When the voltage of the output capacitor is close or equal to the preset voltage X, the voltage of the output capacitor (C2) keeps at the preset voltage for a long time during the B time section, since the hold-up time extension circuit (40) is triggered. Therefore, when the AC power 11 source is interrupted, a load coupled to the output of the DC to DC converter (30) has enough DC power to shut down safely. If the hold-up time extension circuit (40) is not triggered, the voltage of the output capacitor (C2) is decreasing as shown by dotted line (LINE) during the B time section.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A power supply having an extending hold-up time capability comprising:
   a rectifier having an input and an output, wherein the input of the rectifier is adapted to electronically connected to an AC power source;
   a power factor correction circuit having an input terminal, an output terminal and an inductor, wherein the output terminal of the power factor correction circuit is electronically connected to the output of the rectifier;
   a DC to DC converter having an input and at least one output, wherein the input of the DC to DC converter is electronically connected to the output terminal of the power factor correction circuit;
   an output capacitor electronically connected between the input of the DC to DC converter and a ground;
   a hold-up time extension circuit having an input terminal and an output terminal, wherein the input terminal of the hold-up time extension circuit is electronically connected to the input of the DC to DC converter; and
   a hold-up time controlling circuit having
      an induced unit inducing a current of the inductor of the power factor correction circuit to output an induced voltage corresponding to the current of the inductor;
      an electronic switch having a controlling terminal that is electronically connected to the induced unit, wherein the induced unit controls the electronic switch to turn on or turn off; and
      an auxiliary capacitor having
         a first terminal electronically connected to the output of the power factor correction circuit through the electronic switch and the input terminal of the hold-up time extension circuit; and
         a second terminal electronically connected to ground.

2. The power supply as claimed in claim 1, the induced unit of the hold-up time controlling circuit further comprising:
   an induced element having a coil inducting the current in the inductor of the power factor correction circuit to output the induced voltage; and
   a rectifying and filtering circuit electronically connected to the coil to make the induced voltage to the DC voltage and then output the DC voltage to the controlling terminal of the electronic switch.

3. The power supply as claimed in claim 2, the rectifying and filtering circuit further comprising:
   a diode having two ends respectively and electronically connected to the coil and the controlling terminal of the electronic switch; and
   an RC filter having a resistor and a capacitor connected to the resistor in parallel, and electronically connected to the coil in parallel.

4. The power supply as claimed in claim 1, the power factor correction circuit further comprising:
   a diode electronically connected between the inductor and the input of the DC to DC converter;
   a switch having a controlling terminal and electronically connected to the inductor; and
   a power factor controller electronically connected to the switch to control the switch to turn on or turn off.

5. The power supply as claimed in one of claims 1 to 4, wherein the electronic switch of the hold-up time controlling circuit is a FET transistor and further has a diode, wherein the FET transistor having:
   a gate electronically connected to the induced unit;
   a drain electronically to the input of the DC to DC converter; and
   a source electronically connected to the ground through the auxiliary capacitor, wherein the diode of the electronic switch is electronically connected between the drain and the source.

6. The power supply as claimed in one of claims 2, wherein the electronic switch of the hold-up time controlling circuit is a FET transistor and further has a diode, wherein the FET transistor having:
   a gate electronically connected to the induced unit;
   a drain electronically to the input of the DC to DC converter; and
   a source electronically connected to the ground through the auxiliary capacitor, wherein the diode of the electronic switch is electronically connected between the drain and the source.

7. The power supply as claimed in one of claims 3, wherein the electronic switch of the hold-up time controlling circuit is a FET transistor and further has a diode, wherein the FET transistor having:
   a gate electronically connected to the induced unit;
   a drain electronically to the input of the DC to DC converter; and
   a source electronically connected to the ground through the auxiliary capacitor, wherein the diode of the electronic switch is electronically connected between the drain and the source.

8. The power supply as claimed in one of claims 4, wherein the electronic switch of the hold-up time controlling circuit is a FET transistor and further has a diode, wherein the FET transistor having:
   a gate electronically connected to the induced unit;
   a drain electronically to the input of the DC to DC converter; and
   a source electronically connected to the ground through the auxiliary capacitor, wherein the diode of the electronic switch is electronically connected between the drain and the source.

9. The power supply as claimed in claim 1, the diode of the electronic switch is a body diode of the FET transistor.

* * * * *